US012563070B2

(12) United States Patent
Uthaman et al.

(10) Patent No.: US 12,563,070 B2
(45) Date of Patent: Feb. 24, 2026

(54) NETWORK TRAFFIC INSPECTION USING AN AGGREGATE CONTROL METRIC

(71) Applicant: Microsoft Technology Licensing, LLC, Redmond, WA (US)

(72) Inventors: Karthik Uthaman, Seattle, WA (US); Ashok Kumar Nandoori, Frisco, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 18/486,573

(22) Filed: Oct. 13, 2023

(65) Prior Publication Data

US 2025/0126141 A1     Apr. 17, 2025

(51) Int. Cl.
*H04L 29/06*        (2006.01)
*H04L 9/40*         (2022.01)

(52) U.S. Cl.
CPC ...... *H04L 63/1425* (2013.01); *H04L 63/0227* (2013.01)

(58) Field of Classification Search
CPC ............. H04L 63/1425; H04L 63/0227; H04L 63/1416; H04L 63/1408; H04L 63/20
See application file for complete search history.

(56) References Cited

U.S. PATENT DOCUMENTS

| | | |
|---|---|---|
| 2012/0079592 A1 | 3/2012 | Pandrangi |
| 2013/0166576 A1 | 6/2013 | Hudzia et al. |
| 2013/0291107 A1 | 10/2013 | Marck et al. |

| | | | |
|---|---|---|---|
| 2014/0373146 A1 | 12/2014 | Murthy et al. | |
| 2018/0316611 A1* | 11/2018 | Sheldon .................. H04L 45/72 | |
| 2019/0124160 A1* | 4/2019 | Dhamnani ............ H04L 67/146 | |
| 2023/0208857 A1 | 6/2023 | Medvedovsky | |
| 2023/0231818 A1* | 7/2023 | Galles ................. H04L 49/3018 | |
| | | | 370/415 |
| 2025/0080556 A1* | 3/2025 | Feng ................... H04L 63/1466 | |

OTHER PUBLICATIONS

International Search Report and Written Opinion received for PCT Application No. PCT/US2024/048037, Nov. 4, 2024, 12 pages.
Kavisankar, et al., "Efficient SYN Spoofing Detection and Mitigation Scheme for DDoS Attack", In Proceedings of Second International Conference on Recent Trends and Challenges in Computational Models, Feb. 3, 2017, pp. 269-274.
Mosharraf, et al., "A responsive defense mechanism against DDoS attacks", In Proceedings of 7th International Symposium on Foundations and Practice of Security, Nov. 3, 2014, pp. 347-355.

* cited by examiner

*Primary Examiner* — Yogesh Paliwal
(74) *Attorney, Agent, or Firm* — Holzer Patel Drennan

(57)                ABSTRACT

Control of network traffic in a network is provided, including classifying a network request from a network source address using request classifiers selected from a plurality of request classifiers based on the network request satisfying classification conditions of the selected request classifiers, associating the network request with each classifier metric corresponding to the selected request classifiers, aggregating the classifier metrics associated with the network request to determine an aggregate request control metric of the network request, and instructing a network traffic controller to operate on the network request based on whether the aggregate request control metric satisfies a request control condition. Each of the plurality of request classifiers is associated in memory with a corresponding classifier metric.

20 Claims, 6 Drawing Sheets

400

Classify a network request from a network source address using request classifiers selected from a plurality of request classifiers based on the network request satisfying classification conditions of the selected request classifiers
402

Associate the network request with each classifier metric corresponding to the selected request classifiers
404

Aggregate the classifier metrics associated with the network request to determine an aggregate request control metric of the network request
406

Instruct a network traffic controller to operate on the network request based on whether the aggregate request control metric satisfies a request control condition
408

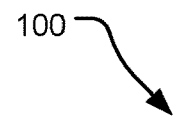
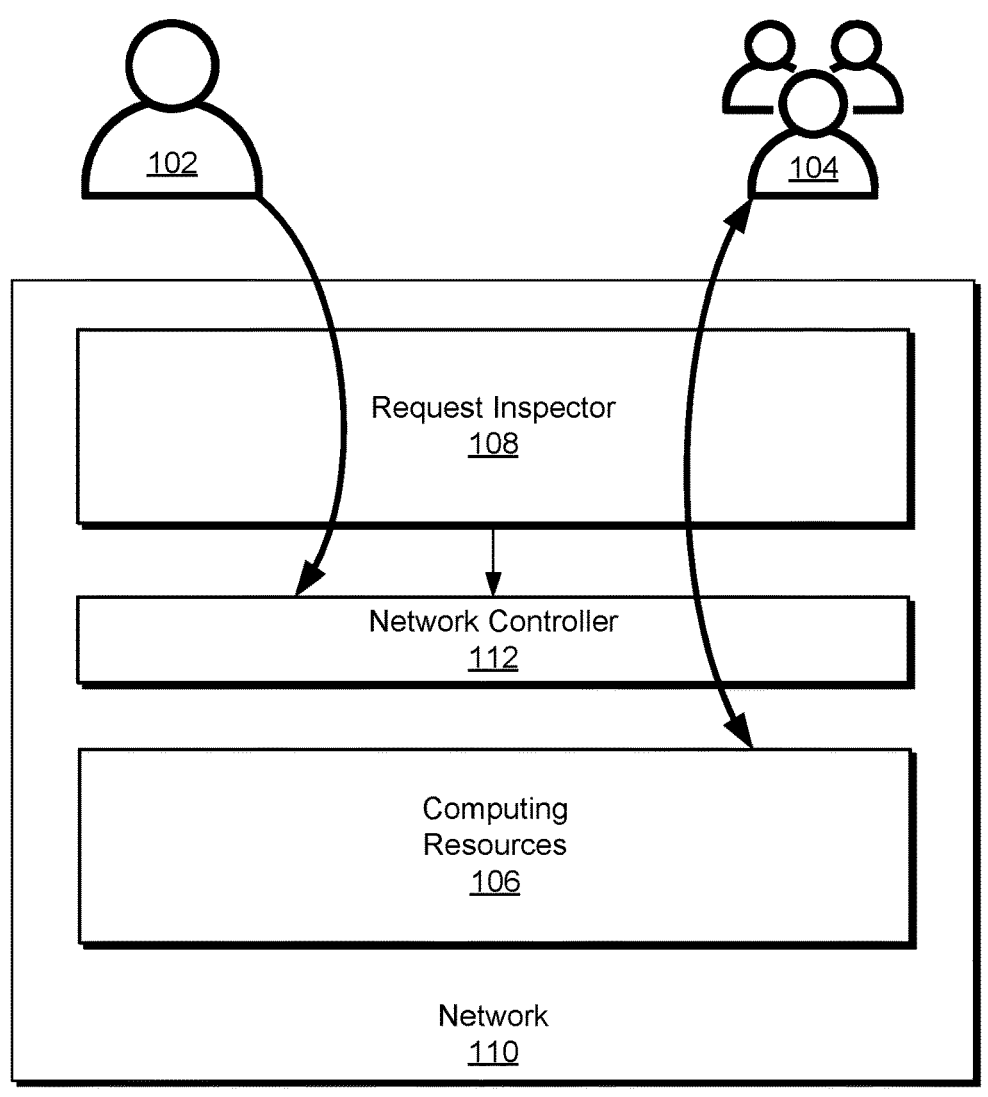
FIG. 1

Figure 2:
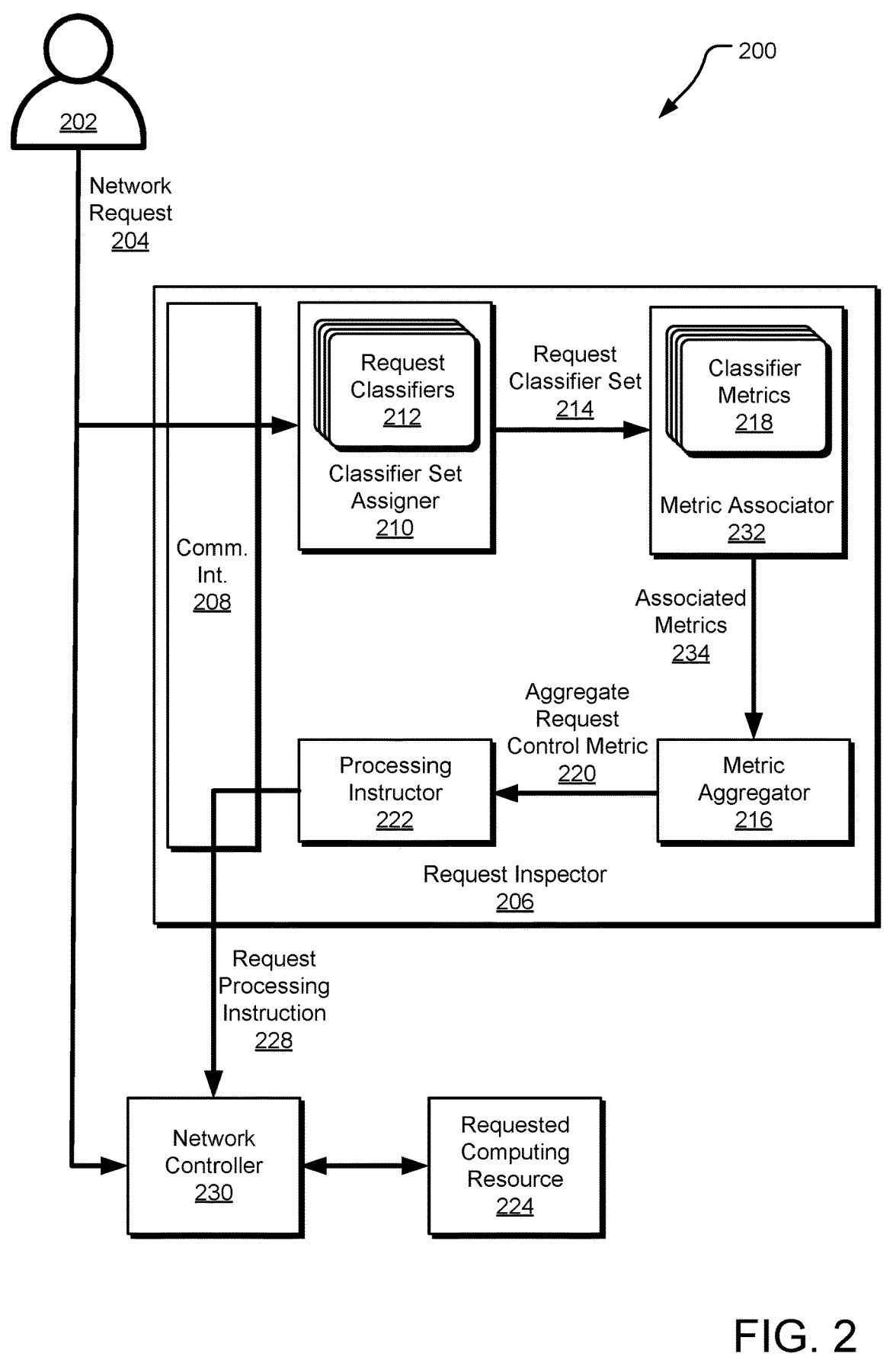

202

Network
Request
204

200

Comm.
Int.
208

Request
Classifiers
212

Classifier Set
Assigner
210

Request
Classifier Set
214

Classifier
Metrics
218

Metric Associator
232

Associated
Metrics
234

Aggregate
Request
Control Metric
220

Processing
Instructor
222

Metric
Aggregator
216

Request Inspector
206

Request
Processing
Instruction
228

Network
Controller
230

Requested
Computing
Resource
224

Figure 4:
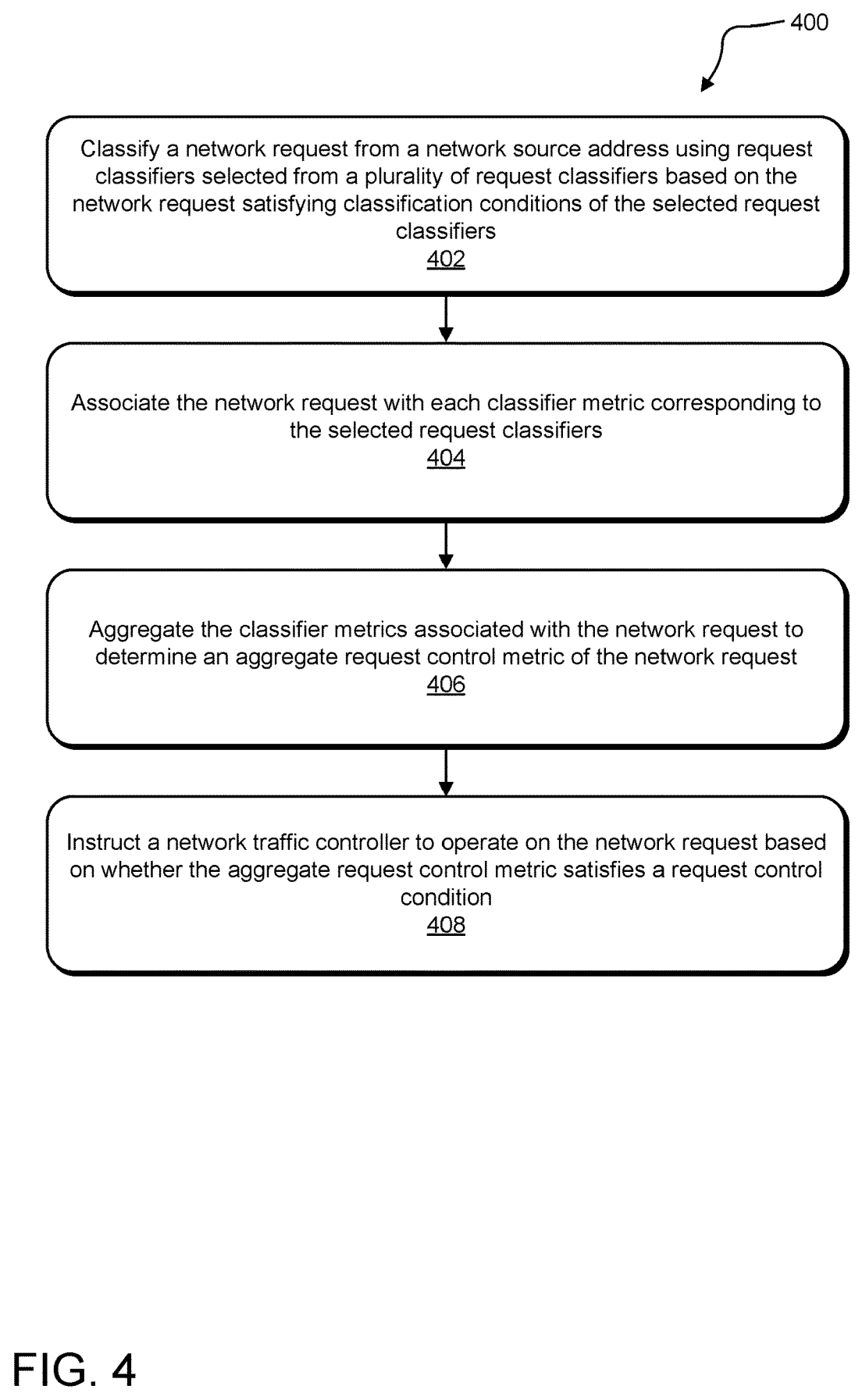

Classify a network request from a network source address using request classifiers selected from a plurality of request classifiers based on the network request satisfying classification conditions of the selected request classifiers
402

Associate the network request with each classifier metric corresponding to the selected request classifiers
404

Aggregate the classifier metrics associated with the network request to determine an aggregate request control metric of the network request
406

Instruct a network traffic controller to operate on the network request based on whether the aggregate request control metric satisfies a request control condition
408

Generate historical data by analyzing network logs
502

Construct request classifiers based on the historical data
504

NETWORK TRAFFIC INSPECTION USING AN AGGREGATE CONTROL METRIC

BACKGROUND

Network servers handle a large number of requests from different users. Some of these users are bad actors and disrupt network servers using Denial-of-Service (DoS) attacks. DoS attacks overwhelm network resources, preventing the network resources from being used to service requests from legitimate users. Network servers discriminate between legitimate traffic and malicious traffic to prevent or mitigate DoS attacks.

SUMMARY

The presently disclosed technology provides control of network traffic in a network, including classifying a network request from a network source address using request classifiers selected from a plurality of request classifiers based on the network request satisfying classification conditions of the selected request classifiers, associating the network request with each classifier metric corresponding to the selected request classifiers, aggregating the classifier metrics associated with the network request to determine an aggregate request control metric of the network request, and instructing a network traffic controller to operate on the network request based on whether the aggregate request control metric satisfies a request control condition. Each of the plurality of request classifiers is associated in memory with a corresponding classifier metric.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTION OF THE FIGURES

FIG. 1 illustrates an example system for controlling network traffic in a network.

FIG. 2 illustrates a schematic view of an example system for controlling network traffic in a network.

FIG. 4 illustrates example operations for controlling network traffic in a network.

DETAILED DESCRIPTION

Figure 3:
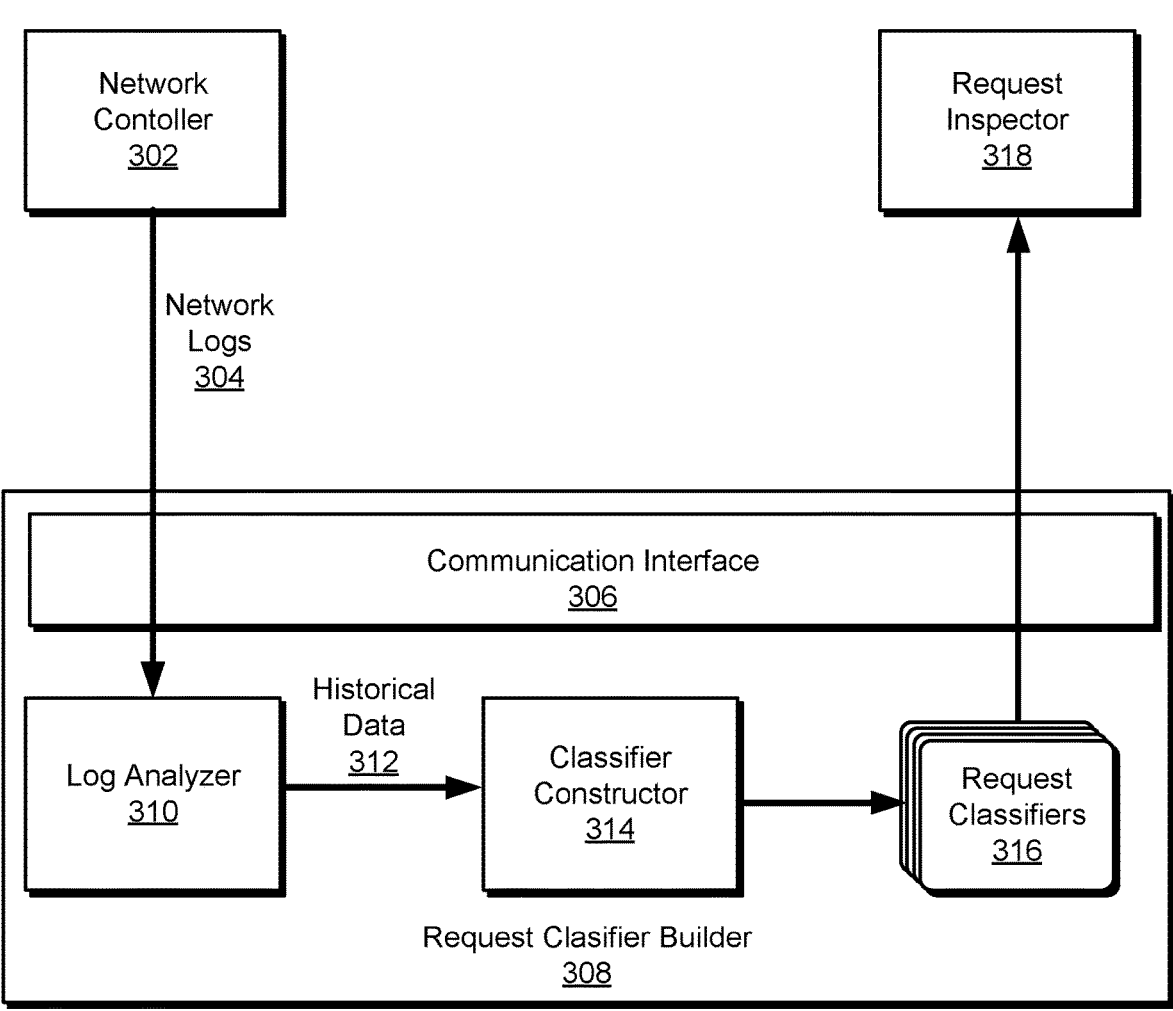
FIG. 3 illustrates an example system for building request classifiers.

Network administrators mitigate or prevent attacks on networks by identifying malicious sources that initiate attacks. For example, in a Denial-of-Service (DoS) attack, the network controllers identify sources that send an inordinate number of requests or inordinately large requests. The networks can block or rate-limit requests of these attacks by identifying the IP addresses and blacklisting the IP addresses. This is effective for simpler attacks, even simple Denial-of-Service (DoS) attacks. Distributed Denial-of-Service (DDoS) attacks present a more complex problem because the attacks include requests from a large number of IP addresses. DDoS attacks are especially difficult to detect when the IP addresses used in the attacks are from proxies or over virtual private networks (VPNs) with a large number of fungible source IP addresses. Because the requests are coming from a large number of different IP addresses, it is difficult for the network to discriminate malicious traffic from legitimate traffic. Also, in some systems, malicious IP addresses are added to a blacklist. The list can be lengthy, and it takes significant time and computational resources to store the list and determine whether an IP address of a request is a member of the blacklist. Consequently, threat detection by these methods is not readily scalable. Further, because a DDoS attack is distributed over a large number of communications from different IP addresses, it may be difficult or impossible to detect any attack pattern or fingerprint from each individual network request.

The presently disclosed technology classifies incoming network requests based on a network source address (e.g., an IP address) from which the request is received to determine whether the requests represent malicious traffic. In an implementation, a request inspector controls network traffic by classifying each network request using multiple request classifiers without checking the network source address of a network request against a list of network addresses. Examples of types of request classifiers include membership filters that determine whether the network request is likely from a network source address represented as a member of a list of network source addresses. One such membership filter is a Bloom filter, although other features for determining membership in a set or classification may be employed. Unlike a long list of network source addresses, a Bloom filter only needs to check whether a hash of the network source address is represented in one or more hashed representations of network source addresses represented in the Bloom filter. This makes checking whether the network source address is a member of the Bloom filter simpler, less computationally resource-intensive, and more scalable relative to methods that check each network source address in a list of source addresses.

In an implementation, the request classifiers are constructed or trained based on historical interactions with a network source address. For example, the request classifiers account for past treatment of a previous request from the network source address. If the network source address has generally made legitimate requests, the classifier can account for the past good history and decrease the likelihood that a request from the network source address is classified as malicious. Also, the system can include classifiers specific to the past treatment of requests from a network source address. For example, if a prior request was classified as one that should be rate-limited with a rate-limiting request classifier, a subsequent request determined to be bad could escalate the classification so that requests from the network source address are classified as blocked to deny the request.

In implementations, the request inspector applies more than one classifier to each request. In these implementations, the inspector determines a request classifier set of request classifiers from among a plurality of request classifiers applied to the request. In an implementation, the request inspector determines the request classifier set by determining that the request satisfies the classification conditions of the request classifiers in the request classifier set. For example, the request inspector determines whether a network source address of a request is a member represented in a set of membership filters. The request inspector then applies metrics (e.g., relative weights) to each of the request classifiers in the request classifier set. The request inspector then determines an aggregate request control metric by aggregating the applied metrics. The request inspector then determines how to operate on or treat the request (e.g., allow, fulfill, deny, limit the response, etc.) based on whether the aggregate request control metric satisfies a request control condition. Examples of a request control condition include a threshold value or range for the aggregate request control metric. In implementations, one or more of the request classifiers may be based on the manner in which the request inspector determined to process a prior request from the network source address from which the current request was transmitted. Using multiple request classifiers to determine a holistic representation of the nature of the request or requestor can allow for a nuanced treatment of the request, such as processing the request with limited resources.

FIG. 1 illustrates an example system 100 for controlling network traffic in a network. A network 110 receives network requests from users, including legitimate users 104 who make legitimate requests and a malicious user 102 who make malicious requests. The network 110 includes a request inspector 108 configured to inspect incoming network requests and determine whether the network will allow the use of computing resources 106 to operate on the network requests. In the illustrated implementation, the malicious user 102 attempts to make a malicious request. The request inspector 108 determines that the request is malicious and instructs the network controller to deny the use of the computing resources 106 to process the request. The legitimate users 104 make requests, and the request inspector 108 determines the requests are legitimate and instructs the network controller 112 to operate on the computing resources 106 to fulfill the requests.

Examples of requests to operate on the computing resources 106 include requests to retrieve data from a network, modify data in a network, delete data in a network, store data in a network, use cloud computing resources (e.g., storage, processors, or bandwidth) to store or process data in the network, or the like. In implementations, requests come in the form of network packets. While described on a per-request basis, the methods and implementations of the presently disclosed technology can be conducted on a per-packet basis within a request. In implementations, network packets include a header, a payload, and/or a trailer. The packet header or trailer can include network routing metadata, including routing addresses, such as a network source address (e.g., an IP address) and/or a destination address. Other examples of routing metadata include packet length, a protocol identifier, a hop limit, a next hop address, an error detection/correction method, and/or a priority. In implementations, the request inspector 108 parses the packet to extract a network source address from which the network packet of a network request was transmitted.

The request inspector 108 uses the network source address or other routing metadata to determine whether the network request is a malicious request from the malicious user 102 or a legitimate request from the legitimate users 104. The request inspector 108 classifies the network request by determining a request classifier set of request classifiers from a plurality of request classifiers. The request inspector 108 determines the request classifier set by determining that the network request and/or the network source address from which the network request is transmitted satisfies classification conditions corresponding to the request classifiers in the request classifier set. Examples of classifications represented by request classifiers include good (e.g., legitimate or trustworthy), bad (e.g., malicious or untrustworthy), unknown (e.g., unknown whether bad or good or from anonymous proxies or unencountered network source addresses), generated by an automated requestor, or the like. More nuanced predefined levels of trustworthiness (numbered level of trustworthiness or threat) between good and bad are also contemplated. In some implementations, if a request is classified by a first request classifier (e.g., good), the request is classified as such to the exclusion of a second request classifier (e.g., bad).

In implementations, the request classifiers are structured in hierarchies such that request classifiers are sub-classifiers of other request classifiers. For example, request classifiers can be tenant-specific such that each tenant in a multi-tenant system in the network additionally or alternatively is associated in memory with a different plurality of request classifiers from which a request classifier set is determined. Tenants are entities with different namespaces that service requests for clients. In implementations, the request classifiers include past treatment classifiers that classify a current network request or network source address based on the treatment (e.g., allow, deny, rate limit, add to a suspicious or blacklist, etc.) of prior requests from a network source address. Hierarchies can also be based on classes of request traffic. For example, automated requesters (e.g., bots) can be treated with request classifiers different from request classifiers applied to human user network requests. Implementations are also contemplated in which some request classifiers are configured to classify all network requests, and some apply to certain classes of network requests or network requests addressed to particular tenants. One example of a hierarchy is a tier for human users and a tier for robot users. Rather than or in addition to a good membership filter, a bad membership filter, and a bot membership filter, the filters could be further divided to include a good human membership filter, a good robot membership filter, a bad human filter, and a bad robot filter. Those could be further provided for each of the tenants to which requests are directed, further dividing the membership to reduce the number of members per membership filter. When using membership filters as request classifiers, a hierarchical structure can limit the number of members in each membership filter, reducing the likelihood that the membership filter will yield a false positive.

Implementations are contemplated in which the classification condition differs for each of the request classifiers. For example, the good request classifier can be based on historical log data or other classifier construction data that is predefined to indicate that the network source address of a network request historically issued legitimate requests. An example of an indication that a network request is good includes that the request inspector 108 or a different request inspector previously instructed a network traffic controller to allow the processing of resources to fulfill a prior network request previously transmitted from the source network address using the network resources (e.g., allowed the request). Similarly, the bad classifier can be based on historical log data that is predefined to indicate that the network request or the network source address is bad. An example of an indication that a network request is bad is that the request inspector 108 or a different request inspector instructed a network traffic controller to operate on a network request previously transmitted from the source network address without or with a reduced amount of the network resources (e.g., deny or data rate-limit the request). The conditions may additionally or alternatively include or be based on threshold ranges or values of request success rates (e.g., percent of requests that are allowed) or time since the last or first request from the network source address.

In implementations, one or more request classifiers include a membership filter. Membership filters are usable to determine whether the network request or a network source address thereof is a member of a set represented by the membership filter. Examples of membership filters include a Bloom filter, an approximate membership query filter (AMQ-Filter), a quotient filter, a probabilistic structure based on hash tables or hash compaction, a cuckoo filter, an XOR filter, a replicating Bloom filter, a Bloomier filter, lattice-based Bloom filter, a counting Bloom filter, a distributed Bloom filter, another Bloom filter variant, or the like. A Bloom filter represents all members of the Bloom filter as hashed representations of the members or elements. Rather than listing all of the members as separate values, the Bloom filter stores all members as hashed representations within one or more membership hashes. In a simple example, if one member is hashed as 1110001 and another member is hashed as 1000100, the hashed representations can be represented as a single membership hash value 1110101 that includes all of the bit values set to one of both of the member hashes. Rather than checking a list of members, the Bloom filter can determine whether a request or address is likely a member by determining whether the same bits of the membership hash and the potential member's hash are set to one. This provides a significantly faster method of determining membership with reasonable certainty than comparing the potential member or its hash to a list of members or hashes thereof.

After the request inspector 108 determines the request classifier set, the request inspector 108 associates classifier request metrics (e.g., relative weights) corresponding to each of the request classifiers in the request classifier set with the network request. In implementations, each of the request classifiers is assigned a static or dynamic classifier request metric. The request inspector 108 then determines an aggregate request control metric by aggregating the associated classifier metrics. The request inspector 108 then instructs the network controller 112 to operate on the request (e.g., allow, deny, limit the response, etc.) based on whether the aggregate request control metric satisfies a request control condition. For example, if the request control metric satisfies the request control condition, the request inspector 108 operates on or treats the network request by allowing the request, denying the request, or processing the request with conditions such as a data rate limit. Allowing the network request may include allowing access to the computing resources 106, and denying the network request may include denying access to the computing resources 106.

FIG. 2 illustrates a schematic view of an example system 200 for controlling network traffic in a network. A user 202 (e.g., a client) transmits a network request 204 from a network source address. The network request 204 is received by a request inspector 206 via a communication interface 208. The network request 204 is sent to a classifier set assigner 210 that includes a plurality of request classifiers 212. The request classifiers may be constructed or trained by a request classifier builder, as described herein. The classifier set assigner 210 is configured to assign one or more request classifiers to a request classifier set 214 based on the network request 204 from a network source address satisfying classification condition(s) of each of the request classifiers in the request classifier set 214. The classifier set assigner 210 applies the plurality of request classifiers 212 to the network request 204 to determine the request classifier set 214.

The classifier set assigner 210 classifies the network request 204 by determining whether the network request 204 satisfies a classification condition for each of the plurality of request classifiers 212, as described herein. The classifier set assigner 210 generates the request classifier set 214 by selecting classifiers, the classification conditions of which the network request 204 satisfied. In implementations, one or more of the plurality of request classifiers 212 include one or more membership filters that determine whether the network request 204 or the network source address are members represented in the one or more membership filters, as described herein. In implementations, the satisfaction of a classification condition is based on whether the network source address or the network request 204 is represented as an element of a membership filter.

The request inspector 206 provides the request classifier set 214 to a metric associator 232. The metric associator 232 includes classifier metrics 218, with each of the classifier metrics 218 associated with one of the plurality of request classifiers 212. In an implementation, the metric associator 232 associates the network request 204 with each classifier metric corresponding to the selected request classifiers in the request classifier set 214 to determine associated metrics 234.

The request inspector 206 provides the associated metrics 234 to a metric aggregator 216. The metric aggregator 216 aggregates the associated metrics 234 (e.g., determines a sum or weighted sum of the associated metrics 234) to determine an aggregate request control metric 220. Any of the classifier metrics 218 may be predefined and may be static and/or dynamic. In some implementations, the classifier metrics 218 include different static or dynamically determined predefined weights specific to each request classifier. In implementations, some of the classifier metrics 218 are positive and others negative. In other implementations, each request classifier is weighted the same, and the aggregate request control metric serves as a request classifier count. The aggregate request control metric 220 is usable as a legitimacy or trustworthiness score for the network request 204 and/or the network source address.

The request inspector 206 provides the aggregate request control metric 220 to a processing instructor 222. The processing instructor 222 determines whether the aggregate request control metric 220 satisfies a request control condition. A request control condition can include a threshold value or range of values of the aggregate request control metric 220. In an implementation, the request control condition provides an "allow" (e.g., fulfill) or a "deny" decision with respect to the network request 204. In other implementations, the request control condition is more complex and applies different levels of processing responses for how to operate on the network request 204 based on predefined values or ranges of values of the aggregate request control metric 220. The processing instructor 222 determines a processing response of how to operate on the network request 204 for inclusion in a request processing instruction 228 based on a comparison of the aggregate request control metric 220 with the request control condition or elements thereof. The comparison determines whether the network request 204 satisfies or fails the request control condition. Examples of different processing responses or treatments to operate on the network request 204 for different values or ranges of values of the aggregate request control metric 220 include allowing the request, denying the request, rate-limiting the request, different levels of rate-limiting depending on the aggregate request control metric 220 value, flagging the network request 204 or the network source address as bad, providing a notification to the user 202, providing one or more different levels of read/write/erase access to a requested computing resource 224 to process the request, or taking more actions to make an unmodified instance of the requested computing resource 224 available in the event the request is to maliciously manipulate the requested computing resource 224.

The processing instructor 222 transmits the request processing instruction 228 via the communication interface 208 to a network controller 230. The request processing instruction 228 instructs the network controller 230 to effectuate the included processing response. In implementations, the network controller 230 determines whether to fulfill the request using the requested computing resource 224 based on the request processing instruction 228. For example, a network request denial may prevent the network controller 230 from providing access to the requested computing resource 224 to process the network request 204.

Implementations in which the network is a multi-tenant system are contemplated. For example, the user 202 transmits the network request 204 to access an implementation of the requested computing resource 224 controlled by a tenant of the multi-tenant system. Any of the request classifiers, classifier metrics, classification conditions, and/or request control conditions may be tenant-specific. The tenant-specific elements may be predefined based on preferences submitted by the tenant associated with the tenant-specific elements. The system 200 may also include one or both of general and tenant-specific variations of the request classifiers, classifier metrics, classification conditions, and/or request control conditions. For example, some request classifiers may be tenant-specific and have tenant-specific analogs to request classifiers of other tenants. Some request classifiers may be tenant-specific for a tenant, with some or no other tenants having analogous request classifiers. The request classifier set can be selected to include at least one tenant-specific request classifier and at least one non-tenant-specific request classifier.

Implementations of the classifier metrics 218, the classification conditions, and/or the request control condition are predefined and may be static or dynamic. Dynamic implementations of the classifier metrics 218, the classification conditions, and/or the request control condition may undergo predefined changes based on factors, such as the quantity of available computing or network resources in a network to process the network request 204 or whether a network is actively experiencing an attack. Also, the plurality of request classifiers, the classifier metrics 218, the classification conditions, and/or the request control metric may be updated periodically (e.g., at predefined intervals) or in response to an event, such as an attack.

FIG. 3 illustrates an example system 300 for building request classifiers 316. A network controller 302 provides network logs 304 to a log analyzer 310 of a request classifier builder 308. The log analyzer 310 analyzes the network logs 304 to determine or extract historical data 312. Examples of historical data 312 include a previous network request from a network source address, metadata associated with a previous network request from a network source address, a previous treatment or response a request inspector generated in response to a previous request from a network source address, a previous response a request inspector generated in response to a previous request from a network source address to a specific tenant, a previous satisfaction of a classification condition by a request from a network source address, a number of successful requests from the network source address, or a previous satisfaction of a request control condition by a request from a network source address.

Metadata associated with the network requests made can include data representing a network source address, a destination network address, a tenant or tenant address to which the network request is directed, a size of the network request (e.g., number of packets or bytes), a time the request was made, a time duration of a request, a frequency of requests made from the same network source address, or a time since the last request made from the same network source address. In the illustrated implementation, the request classifier builder 308 receives the network logs 304 via a communication interface 306 of the request classifier builder 308.

The log analyzer 310 provides the historical data 312 to a classifier constructor 314. The classifier constructor uses the historical data 312 to train or construct request classifiers 316. In implementations, classifier construction data other than the historical data 312 is additionally or alternatively used to construct the request classifiers. Examples of classifier construction data other than the historical data include fingerprints of (e.g., extracted consistencies within) requests from a network source address, existing blacklists including blacklisted network requests and/or network source addresses, analysis of traffic in the network from the source addresses, lists of rate-limited network requests and/or network source addresses. Examples of request classifiers include a good request classifier that classifies likely legitimate network requests, a bad request classifier that classifies likely malicious network requests, an unknown request classifier that classifies network requests that are not readily characterizable as legitimate or malicious, or an automated requestor request classifier that classifies network requests as being generated by an automated requestor (e.g., a bot or data crawler).

The classifier constructor 314 applies predefined rules or a trained inferential model to the historical data 312 and/or other classifier construction data to construct the request classifiers. For example, in the case of membership filters, the classifier constructor uses the predefined rules or trained inferential model to determine which network requests or network source addresses are members of different membership filters and which are not. In implementations, rather than starting from scratch, the classifier constructor 314 updates existing instances of the request classifiers 316 (e.g., to add or remove members or update an inferential model).

In implementations, the request classifiers include past treatment classifiers that classify a current network request or network source address based on the treatment of prior requests. For example, if the system previously treated a network request from a network source address by rate-limiting the network request, a subsequent request from the network source address could be classified by a rate-limiting classifier (e.g., by adding the network source address as a member of a rate-limiting membership filter). In implementations, one or more of the request classifiers 316 include one or more membership filters that the request inspector 318 can apply to a network request and/or a network source address to determine whether the network request and/or the network source address is an element represented in the membership filter, as described herein. In an implementation, the membership filter is a Bloom filter in which member network requests and/or network source addresses are represented as hashed elements.

In implementations, the request classifiers include one or more inferential models (e.g., machine learning models) that are trained to determine whether a network request and/or a network source address is a member of a set. In these implementations, the classifier constructor 314 may train the inferential model using supervised learning with labeled data. For example, the classifier constructor 314 may input the network request and/or a network source address labeled with a label of member or non-member into the inferential model, compare the output of the inferential model with the label, determine a loss or difference based on the comparison, and backpropagate the loss through inferential model to modify the weights and/or constants in the inferential model, and then repeat iteratively until the comparison of the output of the inferential model with the label yields a sufficiently low loss to satisfy a convergence condition. Training methods other than supervised learning training methods are also contemplated. Also, implementations are contemplated in which a single inferential model can output more than one request classifier (e.g., membership in a classification) based on the input of a network request with classifier construction data. Using membership filters or inferential models for determining whether network requests are legitimate saves time and computational resources relative to systems that keep lists of network source addresses and/or requests against which each new network request and/or network source address from which the new network request was transmitted is checked.

In some multi-tenant implementations, the classifier constructor 314 constructs tenant-specific request classifiers that apply exclusively to network requests addressed to a particular tenant. For example, a user may be a malicious user for a particular tenant but a legitimate user for another tenant. Additionally or alternatively, the classifier constructor 314 constructs general request classifiers that apply to requests addressed to all tenants (if any).

After the classifier constructor 314 constructs the request classifiers 316, the request classifier builder 308 provides the request classifiers 316 to the request inspector 318. In implementations, the request classifier builder 308 builds and/or provides new or updated request classifiers periodically (e.g., at regular intervals) and/or in response to one or more events. For example, if the network resources are constrained in satisfaction of a constraint condition (e.g., a threshold value or range of available resources) in the network or an attack is detected in satisfaction of an attack condition (e.g., based on a threshold amount of request throughput or a rule set predefined to indicate an attack), the classifier constructor 314 may classify network requests more strictly, classifying more network requests as suspicious or bad. Similarly, if network resources are less constrained in satisfaction of a relaxation condition (e.g., below a threshold level of utilized network resources), the classifier constructor 314 may classify network requests more loosely by classifying more requests as good or legitimate. In implementations, the request classifier builder provides the request classifiers 316 via the communication interface 306 or a different communication interface to the request inspector 318.

FIG. 4 illustrates example operations 400 for controlling network traffic in a network. A classifying operation 402 classifies a network request from a network source address using request classifiers. The classifying operation 402 selects the request classifiers from a plurality of request classifiers based on the network request satisfying the classification conditions of the selected request classifiers. For example, the classifying operation 402 applies conditions of the classifiers to the network request and/or a network source address from which the network request was transmitted to determine the request classifier set that applies to the network request, as described herein. In implementations, the request classifiers include membership filters and/or inferential models, as described herein. In implementations, the request classifiers may be built based on a request inspector's historical treatment of prior network requests made from the network source addresses. In an implementation, each of the plurality of request classifiers is associated in memory with a corresponding classifier metric.

An associating operation 404 associates the network request with each classifier metric corresponding to the selected request classifiers. The associating operation 404 may apply static or dynamic classifier metrics (e.g., predefined weights) to the request classifiers.

An aggregating operation 406 aggregates the classifier metrics associated with the network request to determine an aggregate request control metric of the network request. The aggregating operation aggregates the classifier metrics of the request classifiers in the request classifier set that applies to the request being treated to determine the aggregate request control metric, as described herein.

An instructing operation 408 instructs a network traffic controller to process the network request based on whether the aggregate request control metric satisfies a request control condition. The instructing operation 408 instructs the network traffic controller to treat the request based on the aggregate request control treatment, as described herein. Examples of treatments include processing the network request to deny the request, allow the request, allow the use of or access to network resources (e.g., computational resources or stored data) to process the request, rate limit the request, or add the request or requestor to a list (e.g., a black list or suspicious list).

Figure 5:
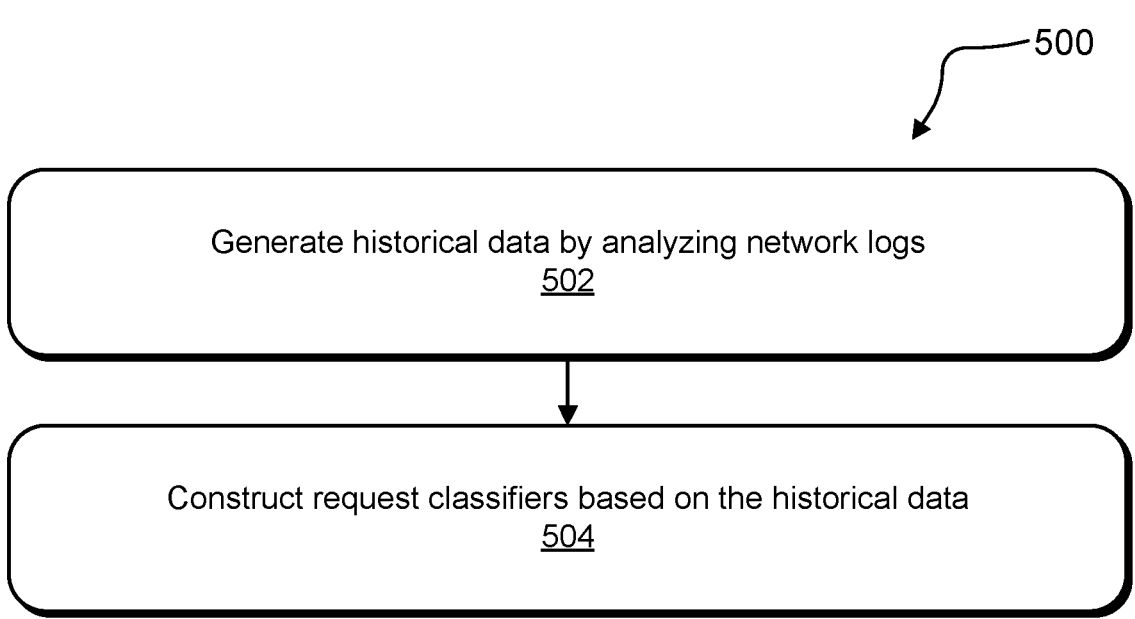
FIG. 5 illustrates example operations for building request classifiers.

FIG. 5 illustrates example operations 500 for building request classifiers. A generating operation 502 generates historical data by analyzing network logs received from a network controller representing logs of historical network requests made from network source addresses. In implementations, the historical data includes the historical treatment of requests from network source addresses, as described herein.

A constructing operation 504 constructs request classifiers based on the historical data. In implementations, the constructing operation 504 additionally or alternatively constructs the classifiers based on other classifier construction data, as described herein. The constructed request classifiers can be provided to or be integrated as an executable element of a request inspector to be used for the inspection of network traffic. In implementations, the request classifiers may be built based on a request inspector's historical treatment of prior network requests made from the network source addresses, as described herein.

Figure 6:
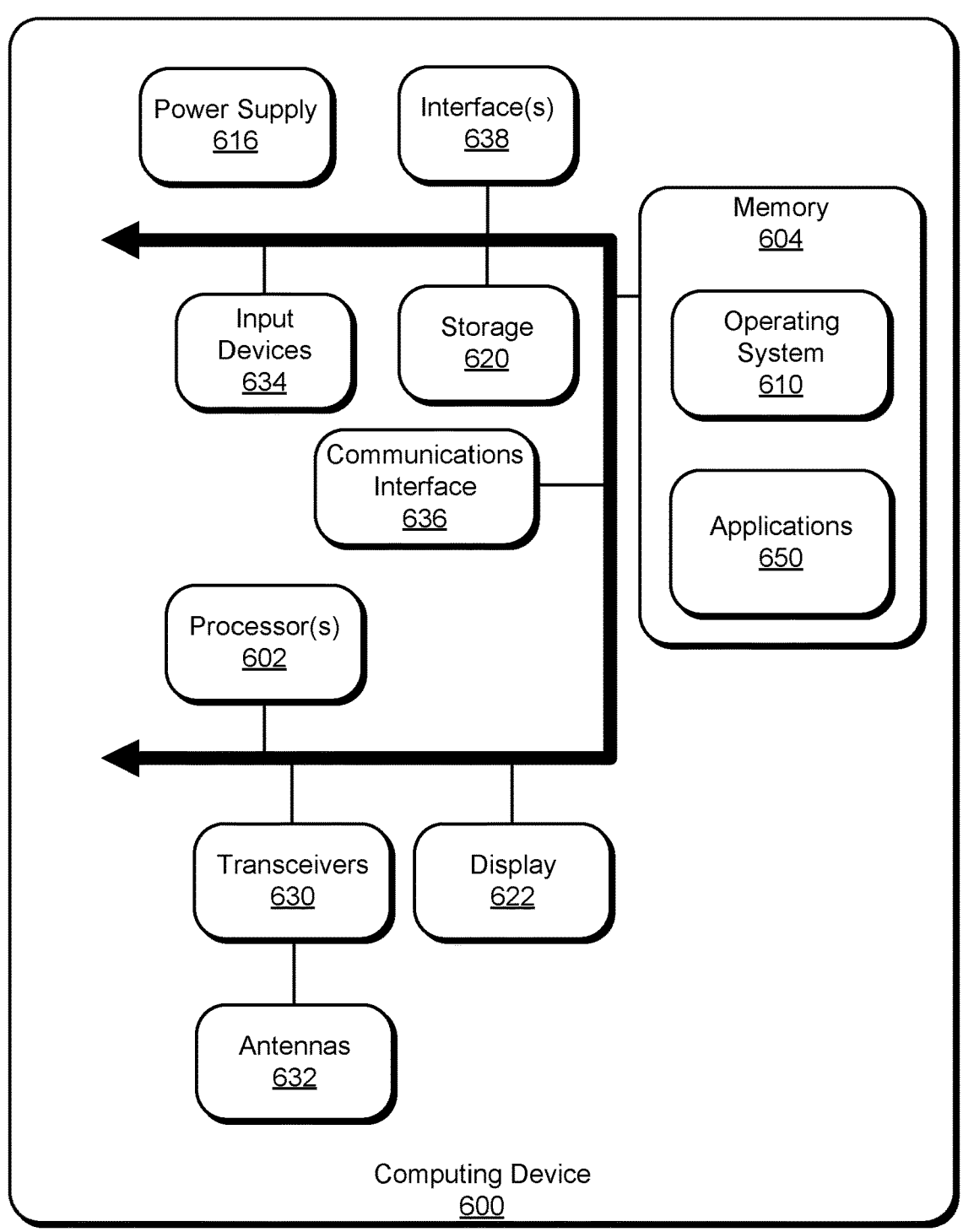
FIG. 6 illustrates an example computing device for use in implementing the described technology.

FIG. 6 illustrates an example computing device 600 for use in implementing the described technology. The computing device 600 may be a client computing device (such as a laptop computer, a desktop computer, or a tablet computer), a server/cloud computing device, an Internet-of-Things (IoT), any other type of computing device, or a combination of these options. The computing device 600 includes one or more processor(s) 602 and a memory 604. The one or more processor(s) 602 may include one or more hardware processors and/or one or more virtual processors (e.g., of a virtual machine or container). The memory 604 generally includes both volatile memory (e.g., RAM) and nonvolatile memory (e.g., flash memory), although one or the other type of memory may be omitted. An operating system 610 resides in the memory 604 and is executed by the processor(s) 602. In some implementations, the computing device 600 includes and/or is communicatively coupled to storage 620.

In the example computing device 600, as shown in FIG. 6, one or more modules or segments, such as applications 650, a request inspector, a request communication interface, a classifier set determiner, a metric aggregator, a processing instructor, an instruction communication interface, a network controller, and other program code and modules are loaded into the operating system 610 on the memory 604 and/or the storage 620 and executed by the processor(s) 602. The storage 620 may store a network resource, a network request, a request classifier, a request classifier set, an assignment metric, an aggregate request control metric, a request processing instruction, a network log, historical data, and other data and be local to the computing device 600 or may be remote and communicatively connected to the computing device 600. In particular, in one implementation, components of a system for controlling network traffic in a network by determining a request classifier set applicable to a network request, aggregating metrics assigned to the request classifier set to determine an aggregate request control metric, and instructing a network controller to process the network request based on the aggregate request control metric may be implemented entirely in hardware or in a combination of hardware circuitry and software. In another implementation, components of a system for building request classifiers for use by a request inspector by generating historical data by analyzing network logs and constructing request classifiers based on the historical data may be implemented entirely in hardware or in a combination of hardware circuitry and software.

The computing device 600 includes a power supply 616, which may include or be connected to one or more batteries or other power sources and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers, client devices, IoT devices, and other computing and communications devices. The computing device 600 may further include a communications interface 636 (such as a network adapter or an I/O port, which are types of communication devices). The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard, trackpad, or mouse). These and other input devices may be coupled to the server by one or more interfaces 638, such as a serial port interface, parallel port, or universal serial bus (USB). Other interfaces may include a sensor or an actuator. The actuator may be configured to move responsive to the sensors (e.g., in a feedback loop) and may be used to execute any operations described herein. The computing device 600 may further include a display 622, such as a touchscreen display.

The computing device 600 may include a variety of tangible processor-readable storage media and intangible processor-readable communication signals. Tangible processor-readable storage can be embodied by any available media that can be accessed by the computing device 600 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes but is not limited to RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of controlling network traffic in a network, the method comprising: classifying a network request from a network source address using request classifiers selected from a plurality of request classifiers based on the network request satisfying classification conditions of the selected request classifiers, each of the plurality of request classifiers being associated in memory with a corresponding classifier metric; associating the network request with each classifier metric corresponding to the selected request classifiers; aggregating the classifier metrics associated with the network request to determine an aggregate request control metric of the network request; and instructing a network traffic controller to operate on the network request based on whether the aggregate request control metric satisfies a request control condition.

Clause 2. The method of clause 1, wherein the satisfaction of one of the classification conditions is based on whether the network source address is represented as an element of a membership filter.

Clause 3. The method of clause 1, wherein classification of the network request by a first of the plurality of request classifiers is exclusive of classification by a second of the plurality of request classifiers.

Clause 4. The method of clause 1, wherein the network request is addressed to a tenant of a multi-tenant system in the network, and at least one of the request classifiers is specific to the tenant among tenants of the multi-tenant system.

Clause 5. The method of clause 1, further comprising: analyzing logs of historical network requests made from network source addresses including the network source address to generate historical data; and constructing the plurality of request classifiers, based on the historical data, wherein the operation of classifying is responsive to the operation of constructing.

Clause 6. The method of clause 1, wherein satisfaction of one of the classification conditions is based on a previous instruction to the network traffic controller to process a previous network request from the network source address.

Clause 7. The method of clause 1, wherein the operation of instructing includes instructing the network traffic controller to fulfill the network request based on the aggregate request control metric satisfying the request control condition.

Clause 8. The method of clause 1, wherein the operation of instructing includes instructing the network traffic controller to deny the network request based on the aggregate request control metric failing to satisfy the request control condition.

Clause 9. A system for controlling network traffic in a network, the system comprising: one or more hardware processors; a classifier set assigner executable by the one or more hardware processors and configured to classify a network request from a network source address using request classifiers based on the network request satisfying classification conditions of the request classifiers, each request classifier being associated in memory with a classifier metric; a metric associator executable by the one or more hardware processors and configured to associate the network request with each classifier metric corresponding to the request classifiers; a metric aggregator executable by the one or more hardware processors and configured to aggregate the classifier metrics associated with the network request to determine an aggregate request control metric of the network request; and a processing instructor executable by the one or more hardware processors and configured to instruct a network traffic controller to operate on the network request based on whether the aggregate request control metric satisfies a request control condition.

Clause 10. The system of clause 9, wherein the satisfaction of one of the classification conditions is based on whether the network source address is represented as an element of a membership filter.

Clause 11. The system of clause 9, wherein classification of the network request by a first request classifier of the request classifiers is exclusive of classification by a second request classifier of the request classifiers.

Clause 12. The system of clause 9, wherein the network request is addressed to a tenant of a multi-tenant system in the network, and at least one of the request classifiers is specific to the tenant among a plurality of tenants in the multi-tenant system.

Clause 13. The system of clause 9, wherein the request classifiers include a request classifier that classifies whether an automated requestor generated the network request.

Clause 14. The system of clause 9, wherein classification of the network request by one of the request classifiers is based on a previous instruction to the network traffic controller to process a previous network request from the network source address.

Clause 15. One or more tangible processor-readable storage media embodied with instructions for executing on one or more processors and circuits of a computing device a process for controlling network traffic in a network, the process comprising: classifying a network request from a network source address using request classifiers selected from a plurality of request classifiers based on the network request satisfying classification conditions of the selected request classifiers, each of the plurality of request classifiers being associated in memory with a corresponding classifier metric; associating the network request with each classifier metric corresponding to the selected request classifiers; aggregating the classifier metrics associated with the network request to determine an aggregate request control metric of the network request; and instructing a network traffic controller to operate on the network request based on whether the aggregate request control metric satisfies a request control condition.

Clause 16. The one or more tangible processor-readable storage media of clause 15, wherein the satisfaction of one of the classification conditions is based on whether the network source address is represented as an element of a membership filter.

Clause 17. The one or more tangible processor-readable storage media of clause 15, wherein the network request is addressed to a tenant of a multi-tenant system in the network, and at least one of the selected request classifiers is specific to the tenant among tenants of the multi-tenant system.

Clause 18. The one or more tangible processor-readable storage media of clause 15, wherein the satisfaction of one of the classification conditions is based on a previous instruction to the network traffic controller to process a previous network request from the network source address.

Clause 19. The one or more tangible processor-readable storage media of clause 15, wherein the operation of instructing includes instructing the network traffic controller to fulfill the network request based on the aggregate request control metric satisfying the request control condition.

Clause 20. The one or more tangible processor-readable storage media of clause 15, wherein the operation of instructing includes instructing the network traffic controller to deny the network request based on the aggregate request control metric failing to satisfy the request control condition.

An example system for controlling network traffic in a network is provided, including means for classifying a network request from a network source address using request classifiers selected from a plurality of request classifiers based on the network request satisfying classification conditions of the selected request classifiers, each of the plurality of request classifiers being associated in memory with a corresponding classifier metric; means for associating the network request with each classifier metric corresponding to the selected request classifiers; means for aggregating the classifier metrics associated with the network request to determine an aggregate request control metric of the network request; and means for instructing a network traffic controller to operate on the network request based on whether the aggregate request control metric satisfies a request control condition.

Another example system of any preceding system is provided, wherein the satisfaction of one of the classification conditions is based on whether the network source address is represented as an element of a membership filter.

Another example system of any preceding system is provided, wherein the classification of the network request by a first of the plurality of request classifiers is exclusive of classification by a second of the plurality of request classifiers.

Another example system of any preceding system is provided, wherein the network request is addressed to a tenant of a multi-tenant system in the network, and at least one of the request classifiers is specific to the tenant among tenants of the multi-tenant system.

Another example system of any preceding system is provided, further including means for analyzing logs of historical network requests made from network source addresses including the network source address to generate historical data; and means for constructing the plurality of request classifiers, based on the historical data, wherein the classification is responsive to the construction.

Another example system of any preceding system is provided, wherein satisfaction of one of the classification conditions is based on a previous instruction to the network traffic controller to process a previous network request from the network source address.

Another example system of any preceding system is provided, wherein the means for instructing include means for instructing the network traffic controller to fulfill the network request based on the aggregate request control metric satisfying the request control condition.

Another example system of any preceding system is provided, wherein the means for instructing includes means for instructing the network traffic controller to deny the network request based on the aggregate request control metric failing to satisfy the request control condition.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax for instructing a computer to perform a certain operation segment. The instructions may be implemented using any suitable high-level, low-level, object-oriented, visual, compiled, and/or interpreted programming language.

The implementations described herein may be implemented as logical steps in one or more computer systems. The logical operations may be implemented (1) as a sequence of processor-implemented steps executing in one or more computer systems or (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

While this specification contains many specific implementation details, these should not be construed as limitations on the scope of any technologies or of what may be claimed but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination. Other implementations are within the scope of the following claims. Nevertheless, it will be understood that various modifications can be made without departing from the spirit and scope of the recited claims.

What is claimed is:

1. A method of controlling network traffic in a network, the method comprising:

receiving a network request from a network source address;

evaluating the network request against classification conditions of request classifiers of a plurality of request classifiers, wherein each of the plurality of request classifiers is associated in memory with a corresponding predefined classifier metric;

selecting a set of the request classifiers from the plurality of request classifiers based on the network request satisfying classification conditions of the selected request classifiers;

associating each predefined classifier metric corresponding to the selected request classifiers with the network request;

aggregating the classifier metrics associated with the network request to determine an aggregate request control metric of the network request; and instructing a network traffic controller to operate on the network request based on whether the aggregate request control metric satisfies a request control condition.

2. The method of claim 1, wherein satisfaction of one of the classification conditions is based on whether the network source address is represented as an element of a membership filter.

3. The method of claim 1, wherein classification of the network request by a first of the plurality of request classifiers is exclusive of classification by a second of the plurality of request classifiers.

4. The method of claim 1, wherein the network request is addressed to a tenant of a multi-tenant system in the network, and at least one of the request classifiers is specific to the tenant among tenants of the multi-tenant system.

5. The method of claim 1, further comprising:

analyzing logs of historical network requests made from network source addresses including the network source address to generate historical data; and constructing the plurality of request classifiers, based on the historical data, wherein the operation of classifying is responsive to the operation of constructing.

6. The method of claim 1, wherein satisfaction of one of the classification conditions is based on a previous instruction to the network traffic controller to process a previous network request from the network source address.

7. The method of claim 1, wherein the operation of instructing includes instructing the network traffic controller to fulfill the network request based on the aggregate request control metric satisfying the request control condition.

8. The method of claim 1, wherein the operation of instructing includes instructing the network traffic controller to deny the network request based on the aggregate request control metric failing to satisfy the request control condition.

9. A system for controlling network traffic in a network, the system comprising:

one or more hardware processors;

a classifier set assigner executable by the one or more hardware processors and configured to receive a network request from a network source address, to evaluate the network request against classification conditions of request classifiers of a plurality of request classifiers, wherein each of the plurality of request classifiers is associated in memory with a corresponding predefined classifier metric, and select a set of the request classifiers from the plurality of request classifiers based on the network request satisfying classification conditions of the request classifiers, each request classifier being associated in memory with a classifier metric;

a metric associator executable by the one or more hardware processors and configured to associate each predefined classifier metric corresponding to the selected request classifiers with the network request;

a metric aggregator executable by the one or more hardware processors and configured to aggregate the classifier metrics associated with the network request to determine an aggregate request control metric of the network request; and a processing instructor executable by the one or more hardware processors and configured to instruct a network traffic controller to operate on the network request based on whether the aggregate request control metric satisfies a request control condition.

10. The system of claim 9, wherein satisfaction of one of the classification conditions is based on whether the network source address is represented as an element of a membership filter.

11. The system of claim 9, wherein classification of the network request by a first request classifier of the request classifiers is exclusive of classification by a second request classifier of the request classifiers.

12. The system of claim 9, wherein the network request is addressed to a tenant of a multi-tenant system in the network, and at least one of the request classifiers is specific to the tenant among a plurality of tenants in the multi-tenant system.

13. The system of claim 9, wherein the request classifiers include a request classifier that classifies whether an automated requestor generated the network request.

14. The system of claim 9, wherein classification of the network request by one of the request classifiers is based on a previous instruction to the network traffic controller to process a previous network request from the network source address.

15. One or more tangible processor-readable storage media embodied with instructions for executing on one or more processors and circuits of a computing device a process for controlling network traffic in a network, the process comprising:

receiving a network request from a network source address;

evaluating the network request against classification conditions of request classifiers of a plurality of request classifiers, wherein each of the plurality of request classifiers is associated in memory with a corresponding predefined classifier metric;

selecting a set of the request classifiers from the plurality of request classifiers based on the network request satisfying classification conditions of the selected request classifiers;

associating each predefined classifier metric corresponding to the selected request classifiers with the network request;

aggregating the classifier metrics associated with the network request to determine an aggregate request control metric of the network request; and instructing a network traffic controller to operate on the network request based on whether the aggregate request control metric satisfies a request control condition.

16. The one or more tangible processor-readable storage media of claim 15, wherein satisfaction of one of the classification conditions is based on whether the network source address is represented as an element of a membership filter.

17. The one or more tangible processor-readable storage media of claim 15, wherein the network request is addressed to a tenant of a multi-tenant system in the network, and at least one of the selected request classifiers is specific to the tenant among tenants of the multi-tenant system.

18. The one or more tangible processor-readable storage media of claim 15, wherein satisfaction of one of the classification conditions is based on a previous instruction to the network traffic controller to process a previous network request from the network source address.

19. The one or more tangible processor-readable storage media of claim 15, wherein the operation of instructing includes instructing the network traffic controller to fulfill the network request based on the aggregate request control metric satisfying the request control condition.

20. The one or more tangible processor-readable storage media of claim 15, wherein the operation of instructing includes instructing the network traffic controller to deny the network request based on the aggregate request control metric failing to satisfy the request control condition.

* * * * *